United States Patent [19]
Kammiller et al.

[11] Patent Number: 5,640,059
[45] Date of Patent: Jun. 17, 1997

[54] POWER SUPPLY SYSTEM INCLUDING THERMAL CURRENT LIMITING PROTECTION

[75] Inventors: Neil A. Kammiller, Lorain; Brian D. Goodlive, Cleveland; Zissis L. Kalivas, Lorain, all of Ohio

[73] Assignee: Reltec Corporation, Lorain, Ohio

[21] Appl. No.: 576,784

[22] Filed: Dec. 21, 1995

[51] Int. Cl.$^6$ ............................................. H02J 7/04
[52] U.S. Cl. ............................ 307/66; 307/64; 323/908; 361/44; 361/58; 361/106; 320/30; 320/35; 236/46 R
[58] Field of Search ........................... 307/66, 64, 43, 307/117, 44; 323/908; 361/58, 106; 320/35, 30, 39; 219/494; 230/46 R

[56] References Cited

U.S. PATENT DOCUMENTS

| | | |
|---|---|---|
| 3,243,598 | 3/1966 | Grillo ............................... 307/68 |
| 3,641,372 | 2/1972 | Green et al. ......................... 327/513 |
| 3,678,363 | 7/1972 | Ringle . |
| 3,723,774 | 3/1973 | Rogers . |
| 4,070,641 | 1/1978 | Khalid ............................... 338/61 |
| 4,093,968 | 6/1978 | Shirley ............................... 361/58 |
| 4,152,635 | 5/1979 | Scott, Jr. . |
| 5,047,961 | 9/1991 | Simonsen . |
| 5,065,676 | 11/1991 | Elias . |
| 5,136,231 | 8/1992 | Faulk . |
| 5,198,744 | 3/1993 | Kohl et al. . |
| 5,206,578 | 4/1993 | Nor . |
| 5,254,930 | 10/1993 | Daly . |
| 5,266,880 | 11/1993 | Newland . |
| 5,278,453 | 1/1994 | Pollmeier ............................... 307/44 |
| 5,319,298 | 6/1994 | Wanzong et al. . |
| 5,502,634 | 3/1996 | Lavrisa ............................... 363/101 |

Primary Examiner—Jonathan Wysocki
Assistant Examiner—Albert W. Paladini
Attorney, Agent, or Firm—Fay, Sharpe, Beall, Fagan, Minnich & McKee

[57] ABSTRACT

A power supply system including a thermal current limiting device operating due to high temperatures. At predetermined temperatures, the device acts to incrementally control the output of a power supply. An implementation of the device may be found in a voltage or power regulator wherein a constant output voltage or power is desired. As temperature increases, the power supply system is not switched off, rather current output is adjusted in a controlled manner thereby eliminating the need for the device to be entirely shut down for a time period. A back-up battery is used to provide supplementing current needed by the load.

16 Claims, 5 Drawing Sheets

POWER SUPPLY SYSTEM INCLUDING THERMAL CURRENT LIMITING PROTECTION

BACKGROUND OF THE INVENTION

This application pertains to the art of power supplies and more particularly to maintaining regulated output power at high ambient temperatures by employing thermal current limiting and back-up power supply techniques in the communication industry.

The invention is particularly applicable to power supply systems which include a backup battery system for supplying power to a load when the primary power supply is operating at a value insufficient to fully supply load requirements. It will be appreciated, however, that the invention has broader applications and may be advantageously employed in other situations that impose similar constraints in the power supply arts.

A variety of regulated power supplies are used in a wide range of environments. Among these are regulated constant voltage output power supplies. In such environments the regulated constant voltage output power supply is provided with overload protection to limit the maximum current which may be drawn from the power supply. Without such protection load current would become excessive resulting in damage to the power supply or to the load. FIG. 1A illustrates a simple block diagram of power supply system A, consisting of a regulated constant voltage power supply 10 used to supply a load 12, where power supply 10 includes current limiter 14.

Two well known types of current limiting are constant current limiting, and foldback current limiting. The first type, constant current limiting, limits the output current to a constant value if the load current attempts to exceed a defined maximum. A graph provided in FIG. 1B illustrates operational characteristics of a constant voltage current limited power supply. When load current 16 reaches its maximum overload rating (e.g. 110% of rated maximum) the power supply 10 switches from a constant voltage output to a constant current output. At this point load current 16 is at its maximum, and voltage 18, which has previously been at a constant 52 volts, begins to decrease 18'.

A more detailed example of the operation of a constant voltage power supply is depicted in FIG. 1C illustrating typical voltage/current characteristics with linear (resistive) load lines 20–26. From this diagram it can be seen that as the load current $I_{load}$ increases from a low value, where output current $I_{load}$ intersects load line 20 (high resistance), to its maximum normal load current $I_{max}$, where output current $I_{load}$ intersects load line 24 (medium resistance), load current $I_{load}$ increases at a constant voltage along characteristic points 20', 22', 24'. At these points all currents and voltages are within the normal working range of the power supply.

When a limiting current value is reached, i.e. point 24', further increase in the load current $I_{load}$ stops. Hence, as load resistance continues to fall toward zero, the load current remains constant and the voltage falls toward zero (see characteristic point 26').

As illustrated by FIG. 1D, foldback current limiting, is similar to constant current limiting, except that as the voltage is reduced, as a result of the load resistance moving towards zero, load current $I_{load}$ is also induced to fall. The resistive load line 30 has its point of origin at zero and load current $I_{load}$ is proportional to the voltage. As the resistive load line 30 shifts, to 30', the straight load line 30 which starts vertically at zero load (i.e., infinite resistance) swings clockwise around the origin to a horizontal position, representing a short circuit, i.e. a zero resistance situation. Thus, straight resistive load line 30 crosses the foldback characteristic of the power supply at only one point. In FIG. 1D, as the load current $I_{load}$ increases from zero, the voltage initially remains constant at the stabilized 52-Volt output. However, when the maximum limiting current $I_{max}$ is reached at 32', any further attempt to increase the load (i.e. reduction of load resistance) results in a reduction in both output voltage and load current $I_{load}$ so operating points, 34, 36 are maintained within a working range which will not cause damage to the power supply or load. Under short circuit conditions, only a small current $I_{sc}$ flows in the output terminals.

In the above purely resistive loads, as there is only one operating point, control of the system is somewhat simplified. However, when the load is a constant power load such as 12 of FIG. 1A, a substantially different type of load line 38, depicted in FIG. 1E exists. In a constant power load system such as that of the present invention, there are two operating points 40 and 42. While systems having such dual operating points are useful when operating within a normal working range, when operating at extreme conditions load line 38 can, as shown by load line 38', be moved out of the normal operating range, i.e. to points 40', 42'. In such a situation, instability of an entire system can occur. Therefore, in constant power load environments as that of the present invention, maintaining the system within the normal working range of power supply 10 is an important consideration.

While the above described current limiting techniques are useful in protecting power supplies from damage, they may also result in a power supply being forced to enter an "offstate" where no output is generated. In this situation a connected load does not receive the power it requires and in turn shuts down or operates in an unstable manner.

As illustrated in FIG. 2, power supply system B is provided with back-up battery supply system 44, including back-up batteries 46. This system is similar to system A of FIG. 1A except that battery back-up system 44 has been operatively connected between the power supply 10 and constant power load 12. In known battery back-up systems, the back-up battery is selectively switched to replace the output from the regulated power supply upon failure of an AC source 48 or upon some other event that undesirably effects the power supply output. Back-up battery system 44 is continuously connected, or "floated", directly across the output of regulated power supply 10. Through this arrangement, when due to high ambient temperature or other event the power supply enters an off-state, back-up battery power system 44, including back-up battery 46, is used to supply constant power load 12. It is to be appreciated back-up battery 46 may consist of a single battery or of a plurality of batteries.

A system which provides power to constant power loads and which has current limiting does, however, have drawbacks. In such a system, when a predetermined temperature is sensed, a thermal protection system causes the regulated voltage power supply to immediately shut down. Particularly, when the predetermined temperature is reached the system immediately enters an off-state until the heat which caused the increase in temperature has dissipated. Thereafter, an automatic turn-on circuit restarts the constant voltage power supply. In systems having such thermal protection, the back-up battery system will supply power to the load when the power supply has been taken off-line. Battery back-up systems, however, have a finite supply capability, therefore, in environments where high ambient temperatures repeatedly cause the thermal protection system to place the regulated power supply into the off-state or, if other factors cause the power supply to frequently enter the off-state, the back-up battery can become discharged to such a level that it will not be able to fully supply load requirements.

It has been deemed desirable to develop a regulated power supply system with battery back-up and thermal current limiting, wherein when a predetermined ambient temperature is reached output from the regulated power supply decreases but does not enter an off state; and to develop a system where the output of the regulated power supply is supplemented by the battery back-up system when the power supply is in a reduced operation state.

SUMMARY OF THE INVENTION

The present invention contemplates a new and improved regulated power supply system that overcomes the above noted problems and others, and which maintains a constant output during periods of high ambient temperatures, where a back-up battery supply is used to supply power when the regulated power supply is not able to fully supply the load, in such a lowered output state.

According to another aspect of the invention, the power supply includes a thermal current limiter which incrementally operates to lower the output of the supply during periods of high ambient temperatures.

A principal advantage of the present invention is the provision of a power supply regulation system which protects the power supply system while at the same time maintaining power to the load during high ambient temperatures.

Another advantage of the present invention is achieved through the use of a thermal current limiter to incrementally lower the output of the power supply at high ambient temperatures.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DESCRIPTION OF THE PREFERRED EMBODIMENTS

Figure 1A:
FIG. 1A illustrates an example of a regulated voltage power supply system supplying a load.
Figure 1B:
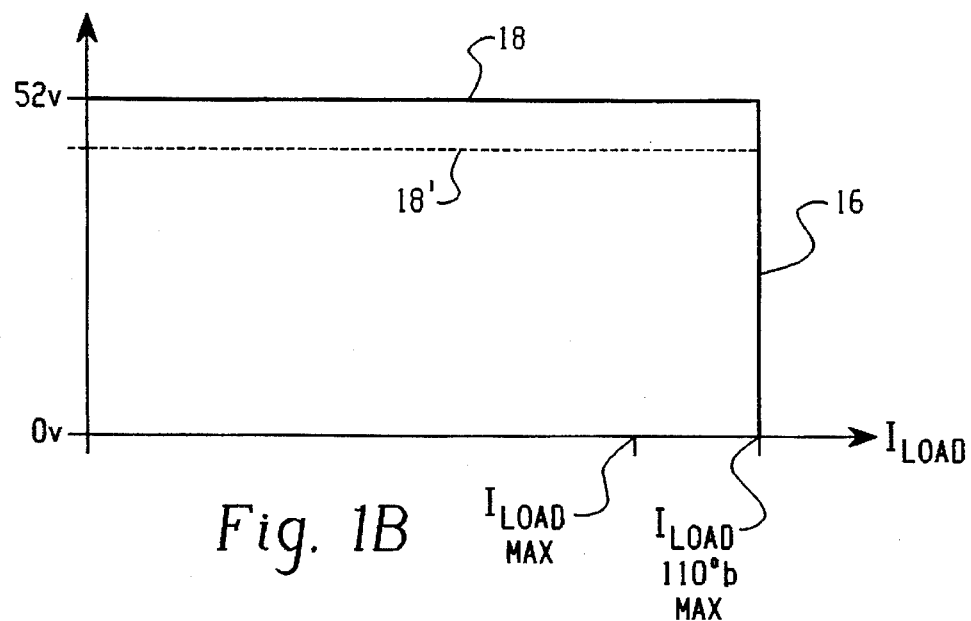
FIG. 1B depicts operational characteristics of a power supply which switches from constant voltage operation to constant current operation upon reaching a predetermined overload value.
Figure 1C:
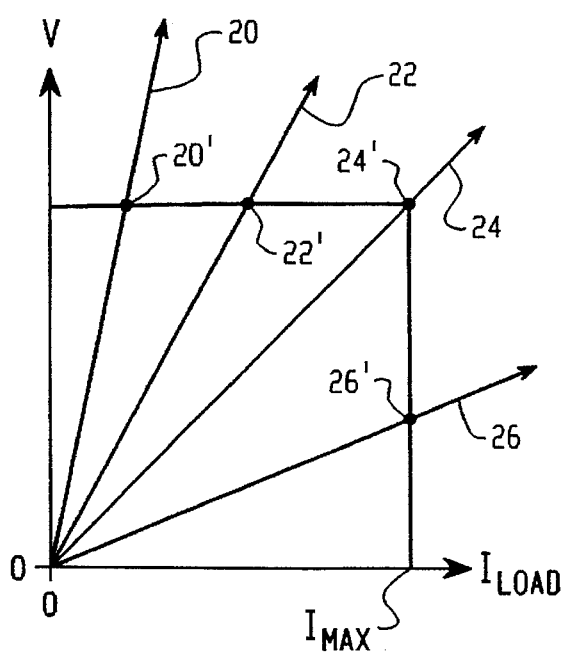
FIG. 1C shows a graph of typical voltage versus current characteristics for a constant current limited power supply with resistive load lines.
Figure 1D:
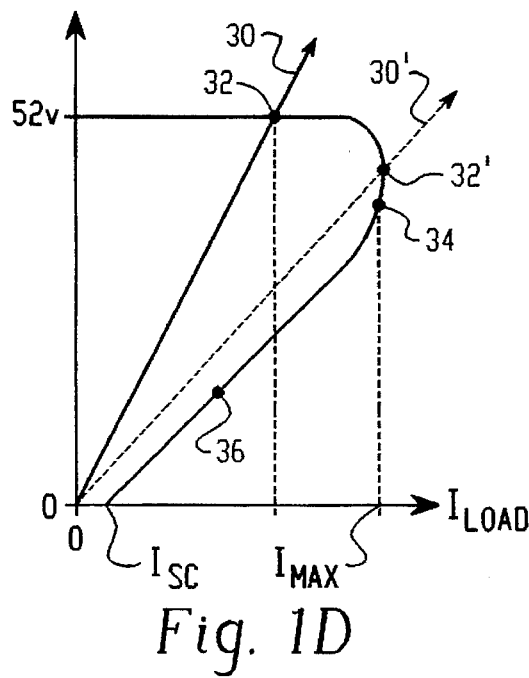
FIG. 1D shows a graph including operating characteristics during current overload of a fold-back current-limited power supply.
Figure 1E:
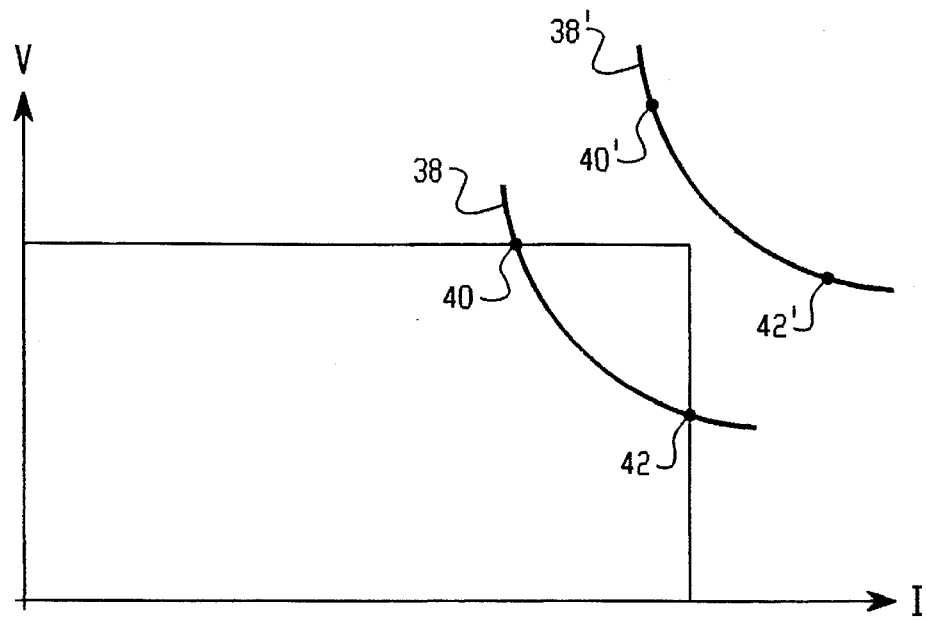
FIG. 1E illustrates operating characteristics of a constant voltage power supply for supplying power to a constant power load.
Figure 2:
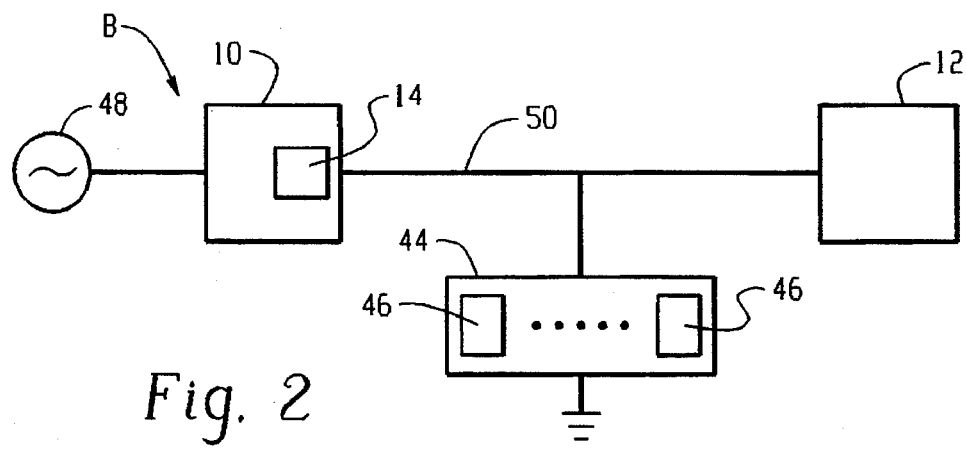
FIG. 2 depicts a prior art power supply system including a back-up battery system used to supply a load.
Figure 3:
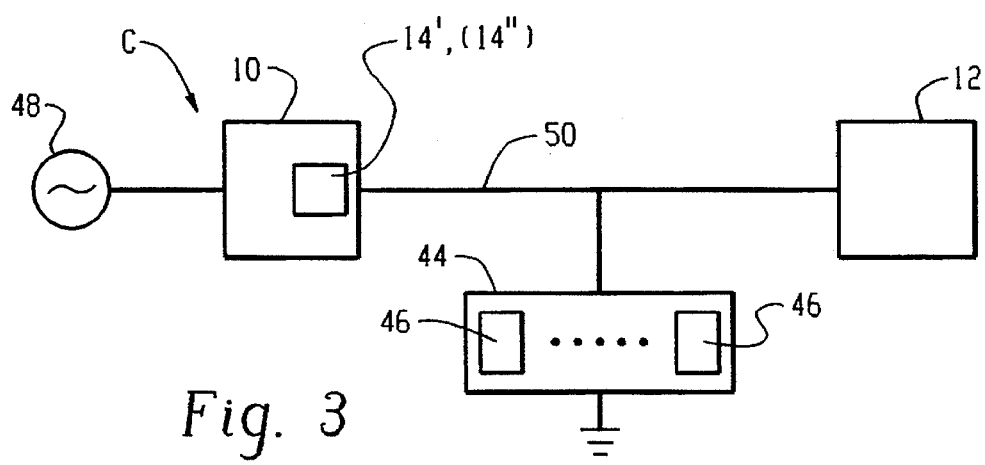
FIG. 3 provides a constant voltage power supply with a thermal current limiter supplying a constant power load according to the subject invention.

FIG. 3 illustrates a constant voltage power supply system C according to the present invention. In this embodiment, AC/DC constant voltage power supply 10 includes thermal current limiter 14' (14"). The power supply 10 is connected to constant power load 12 through transmission line 50. Connected to transmission line 50 between power supply 10 and constant power load 12 is back-up battery supply system 44, including back-up battery 46, which in turn is connected to ground.

For the following discussion it is assumed that load 12 requires 100 amps, and constant voltage power supply 10 is capable of generating 140 amps as its maximum output. It is to be appreciated that the cited parameters are for discussion purposes and the subject invention may be used with power supplies having other values.

To accomplish the above, constant voltage power supply 10 includes current limiter 14' (14") which, upon sensing a predetermined temperature incrementally lowers the output of power supply 10. When extreme temperatures are reached constant voltage power supply 10 will eventually reach an off-state. The gradual reduction, however, allows maintaining at least partial output from constant voltage power supply 10 at higher ambient temperatures, reducing stress placed on battery back-up system 44.

Figure 4:
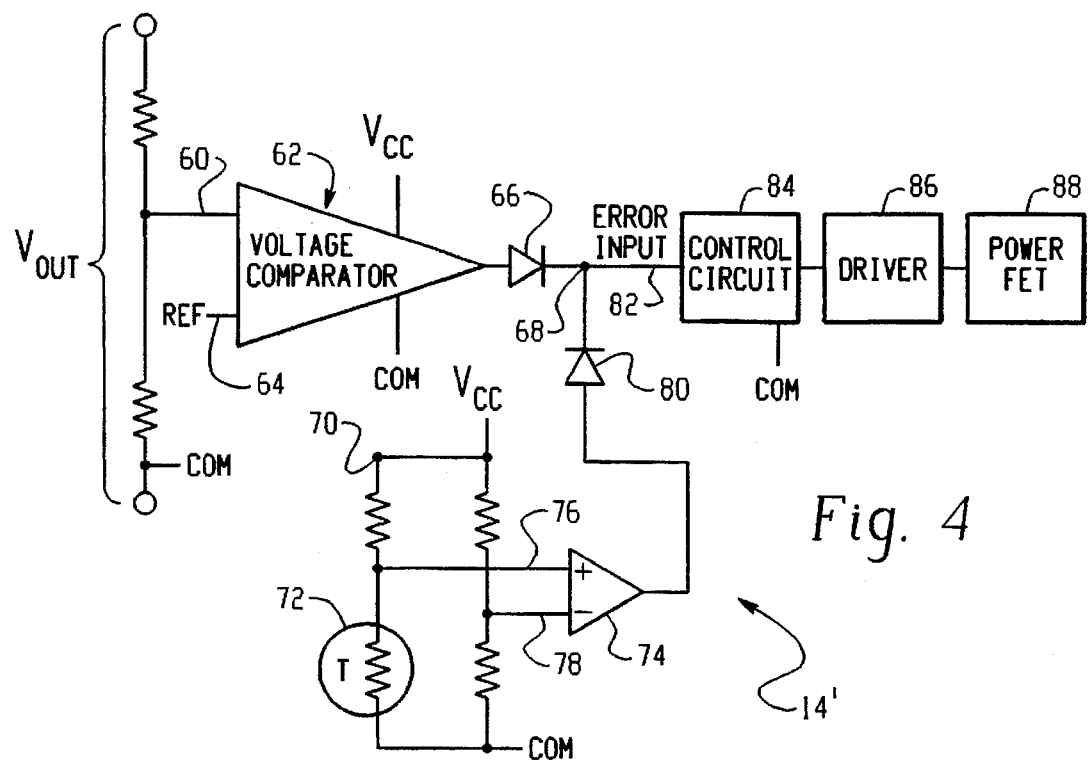
FIG. 4 is a more detailed view of a thermal current limiting device of the regulated constant output voltage power supply.

FIG. 4 provides a more detailed view of thermal current limiter 14'. A first input 60 of voltage comparator 62 is supplied with a constant voltage. Second input 64 is tied to a reference voltage. The voltage on inputs 60 and 64 are compared in voltage comparator 62 and output through diode 66 to connection point 68.

A resistance bridge 70, includes temperature sensitive element 72 to sense the ambient temperature. A change in the resistance of element 72 unbalances bridge 70 thereby causing unequal input signals on inputs 76 and 78, supplying amplifier 74. This difference is amplified and passed through diode 80 and passed to connection point 68. Outputs, from diodes 66 and 80 are "OR"ed at connection point 68 to generate an error input signal transmitted on line 82 to control circuit 84. Control circuit 84 includes known circuitry to adjust, i.e. limit or increase the output of power supply 10. Control circuit 84 produces an output to control driver circuit 86 which in turn controls power FET 88 in a known manner.

Figure 5:
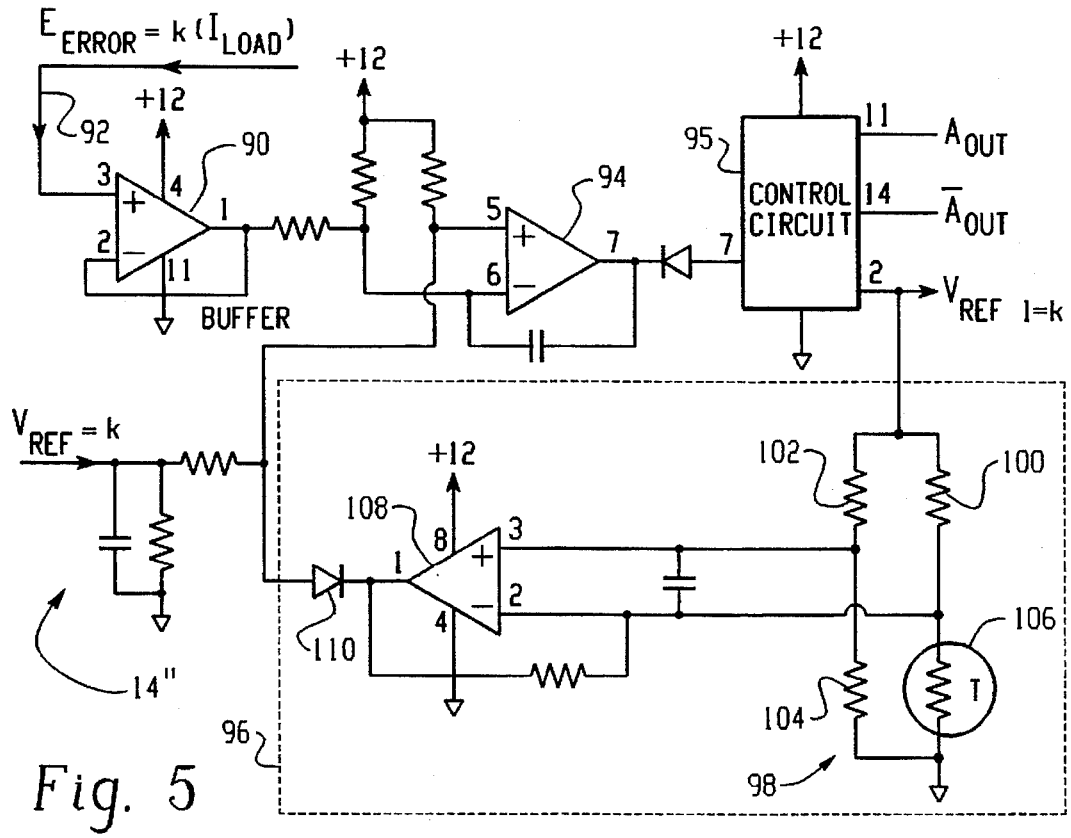
FIG. 5 provides a more detailed circuit description of the thermal current limiting device according to the subject invention.

FIG. 5 depicts another embodiment of a thermal current limiter 14" according to the subject invention. The current limiter in FIG. 5 operates in a normal range of 50 volts and 25 amps, as an off-line switcher. The device has a capability of continuously monitoring the ambient temperature of power supply 10 by means of a thermistor, discussed in greater detail below. If the ambient temperature of the power supply 10 exceeds design limitations, output operation is inhibited. The circuit which inhibits operation at high temperatures will automatically recover if the temperature of the power supply returns to the design limits. In this embodiment, the components of power supply 10 were designed to withstand at least +85° C. The ambient temperature of the power supply was specified at 65° C. maximum. The subject system, however, is designed to be able to deliver some load above the +65° C. ambient temperature but does not exceed the thermal limits of the power supply components.

Figure 6:
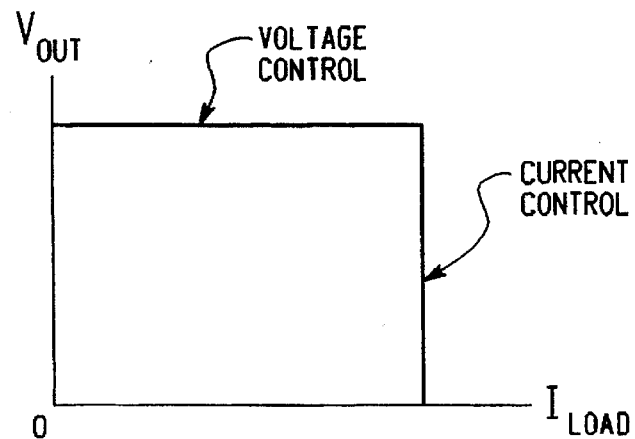
FIG. 6 illustrates a voltage versus current load graph showing a voltage mode and a current mode of the subject invention.

With further attention to FIG. 5, an error signal which is proportional to load current is applied to pin 3 of amplifier 90. Amplifier 90 is a buffer stage, used to avoid loading of error signal source 92. The buffered error signal from error signal source 92 is applied to pin 6 of amplifier 94 and is compared to a reference voltage applied to pin 5 of amplifier 94. The output of amplifier 94 is then passed to control circuit 95 for controlling the output from power supply 10. When voltage at pin 6 of amplifier 94 becomes slightly greater than pin 5 of amplifier 94, power supply 10 switches automatically from a voltage control to a current control as depicted in FIG. 6. The output voltage ($V_{out}$) load current ($I_{load}$) characteristics are valid for any operating temperature within the specified limits of the power supply (e.g. −40° C. to +65° C.).

Figure 7:
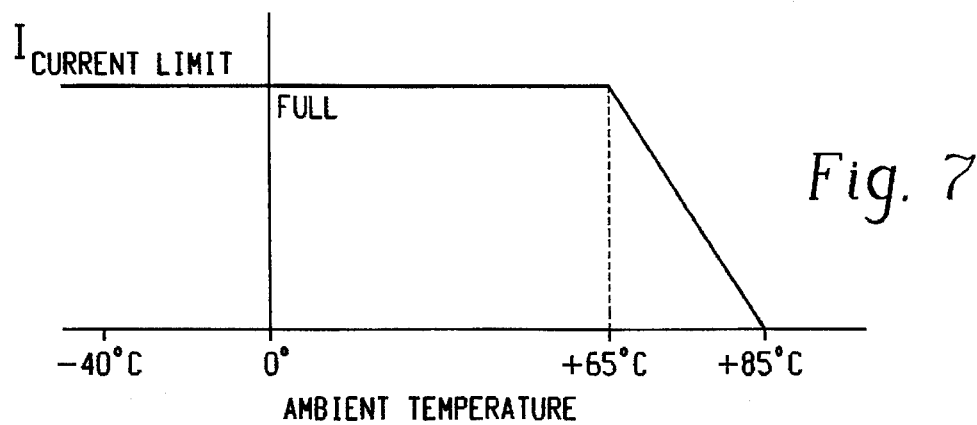
FIG. 7 illustrates a graph of ambient temperature versus current load showing linear operation from full load to zero current.

The circuit indicated by dotted line 96 in FIG. 5, is used to reduce the load capability of the power supply 10 linearly from full load at +65° C ambient temperature down to zero (0) current at +85° C. ambient as illustrated in FIG. 7. As further shown in FIG. 5, resistance bridge 98 includes resistors 100, 102, 104 and temperature sensitive element 106, such as a positive temperature coefficient silicon sensor. Temperature sensitive element 106 is mounted in a location within the power supply to monitor the ambient temperature. The resistance of temperature element 106 increases with increasing ambient temperature. Pin 3 of amplifier 108 will be maintained as more positive than pin 2 of amplifier 108 for any ambient temperature less than or equal to +65° C. Under these circumstances, pin 1 of amplifier 108 is high and diode 110 is back-biased making the circuit in dotted line 96 non-functional.

Figure 8:
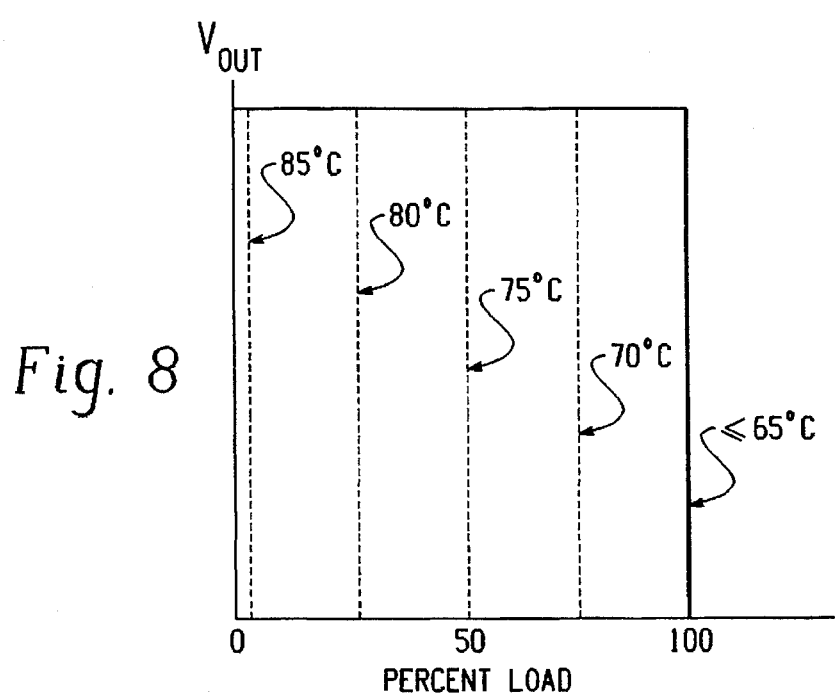
FIG. 8 shows a graph of current limiting at various ambient temperatures.

When the ambient temperature is greater than +65° C., diode 110 is forward-biased and voltage at pin 5 of amplifier 94 is reduced linearly as a function of ambient temperature, due to the finite gain of amplifier 108. As can be seen in FIG. 7, since the current limit reference is reduced linearly, as ambient temperature increases, the current limit set-point is reduced to the point that at +85° C. ambient temperature, the current limit point approaches zero (0). FIG. 8 illustrates that voltage output can be maintained at higher temperatures when load is less than 100% but at certain current limits, the voltage will fall.

Figure 9A:
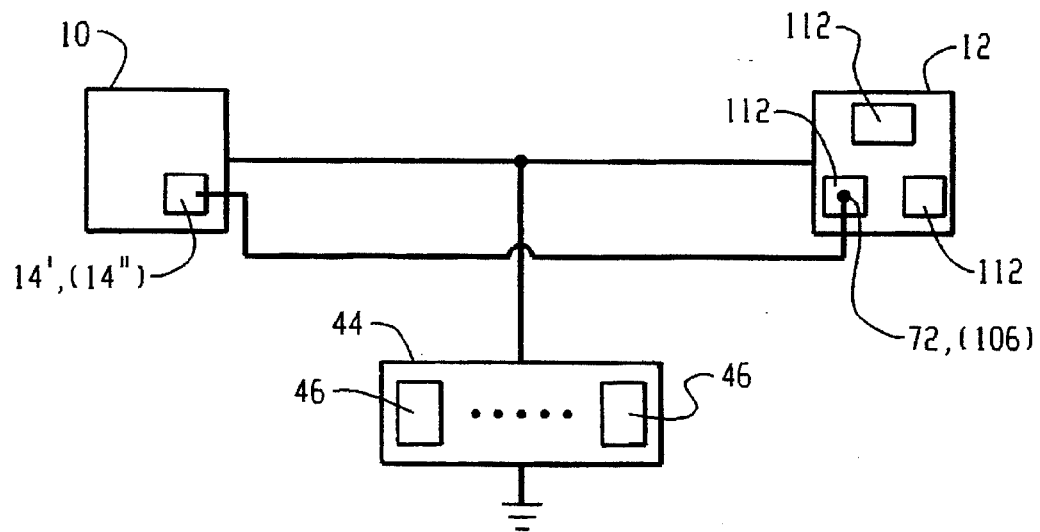
FIG. 9A illustrates a temperature sensing device used in the subject invention arranged to sense the temperature of a component.
Figure 9B:
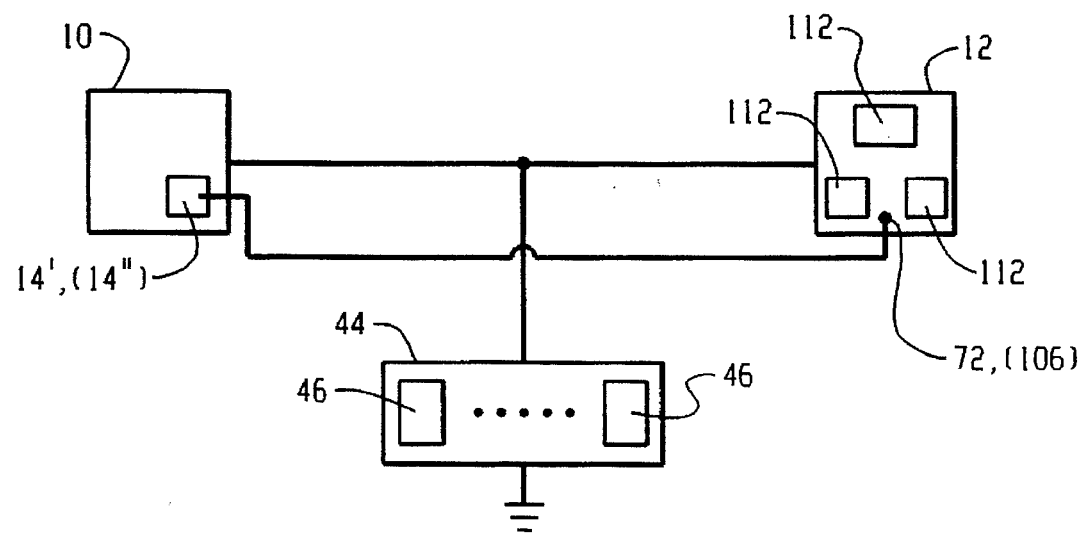
FIG. 9B illustrates a temperature sensing device used in the subject invention arranged to sense ambient temperature.

It is to be appreciated that the current limiting circuits described in FIGS. 4 and 5 may be used to sense both ambient temperature changes and temperature changes for a specific component. To accomplish this, the temperature sensitive element 72 (106) is located at appropriate locations dependent upon which type of temperature sensing is desired. When temperature of a specific component 112 is to be sensed then temperature sensing element 72 (106) is placed in contact with that component. On the other hand, if ambient temperature is to be sensed, sensing element 72 (106) is placed in a location which will be more representative of overall device temperature. Alternative placement of the sensing element is illustrated in FIGS. 9A and 9B, wherein FIG. 9A illustrates temperature sensing device 72 (106) arranged to sense a particular component temperature and FIG. 9B illustrates placement for ambient temperature sensing.

A distinction between the sensing of ambient temperature and component temperature is that sensing the temperature of a component is a closed loop type control system. Particularly, there is a direct relationship between component temperature and output. However, ambient temperature sensing is more of an open loop control system wherein rather than a direct relationship to a particular component, the output is based on the temperature of an environment associated with the system in which components reside.

Using the subject invention, the current limit point can be controlled and adjusted based on both ambient temperature and/or component temperature. Particularly, a predetermined temperature range may be selected where current limiting begins to reduce the contribution of output power provided from the power supply to the load, with the backup batteries supplying the remaining load requirements.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A power supply system comprising:
    a constant voltage output source connected to a load, which is to be supplied;
    a thermal current limiter in operative connection between the constant voltage output source and the load, the thermal current limiter constructed so as to incrementally lower an output of the constant voltage output source corresponding to a rise in temperature; and
    a back-up battery in operative connection with the constant voltage source and the load.

2. The power supply system according to claim 1 wherein the constant voltage output source is a regulated AC-DC power supply.

3. The power supply system according to claim 1 wherein the load requires a constant power output.

4. The power supply system according to claim 1 wherein the back-up battery is configured to supply a portion of power to the load when the constant voltage output source is at an incrementally lowered operating level.

5. The power supply system according to claim 1 wherein the thermal current limiter is temperature sensitive.

6. The power supply system according to claim 1 wherein the back-up battery has a capacity to supply a load for a known predetermined time period.

7. The power supply system according to claim 1 wherein the thermal current limiter includes:
    a comparator with two inputs, a first input connected to a constant voltage and a second input connected to a reference voltage, the voltage comparator comparing signals on the first and second inputs and generating a comparison signal;

a temperature sensitive bridge network which generates a temperature sensitive output signal;

an amplifier arranged to receive and amplify the temperature sensitive output signal;

a combination node which receives and combines the comparator signal and the temperature sensitive signal to generate an error signal; and a control circuit arranged to receive the error signal and generate a control signal based on the error signal.

8. The power supply system according to claim 1 wherein the constant voltage output source is an AC/DC 48 volt power supply.

9. The power supply system according to claim 1 wherein the thermal current limiter includes a load supply limiting circuit comprising:

a buffer circuit which receives an error signal and generates a buffered error signal;

a temperature sensitive circuit which generates a temperature sensitive output signal that varies in correspondence with an ambient temperature; and a comparator circuit which receives and compares the buffered error signal and the temperature sensitive output signal, wherein based on the output of the comparison the power supply is placed into or maintained in one of voltage control and current control.

10. The power supply system according to claim 9 wherein the temperature sensitive circuit further includes:

a temperature comparator amplifier; and, a temperature sensitive bridge network which outputs signals to the temperature comparator amplifier, wherein when the temperature is below a predetermined value an output from the temperature sensitive circuit is blocked, and when the temperature is above a predetermined value the output of the temperature sensitive circuit acts to reduce the output of the power supply.

11. The power supply system according to claim 1 wherein the thermal current limiter is configured to sense ambient temperature, whereby current limiting is based on the sensed ambient temperature.

12. The power supply system according to claim 1 wherein the thermal current limiter is configured to sense the temperature of a component, whereby current limiting is based on the sensed component temperature.

13. The power supply according to claim 1 wherein the constant voltage output source and load operate without a back-up battery.

14. A power supply system comprising:

a constant power load;

a constant voltage output source connected to the constant power load;

a thermal current limiter in operative connection between the constant voltage output source and the constant power load, the thermal current limiter constructed to incrementally lower an output of the constant voltage output source corresponding to a rise in temperature, the thermal current limiter including a temperature sensor located in sensing relationship with the constant power load which is a separate device and distanced from the thermal current limiter, to sense a temperature value at the constant power load, wherein the sensed temperature value is used by the thermal current limiter to control output of the constant voltage output source.

15. The power supply system according to claim 14 further comprising a back-up battery in direct connection with the constant voltage source and the constant power load.

16. The power supply system according to claim 14 wherein the constant voltage output source operates between −40° C. to +65° C.

* * * * *